United States Patent [19]
Tichelaar

[11] Patent Number: 5,854,660
[45] Date of Patent: Dec. 29, 1998

[54] METHOD AND APPARATUS FOR DECODING AN ANALOG EXTENDED VIDEO SIGNAL HAVING SIGNALLING INFORMATION INCLUDED THEREIN FOR CONTROLLING THE DECODING OPERATIONS

[75] Inventor: Johannes Y. Tichelaar, Eindhoven, Netherlands

[73] Assignee: U.S. Philips Corporation, New York, N.Y.

[21] Appl. No.: 553,811

[22] Filed: Oct. 23, 1995

[30] Foreign Application Priority Data

Oct. 28, 1994 [EP] European Pat. Off. .............. 94203156

[51] Int. Cl.$^6$ ..................................................... H04N 7/12
[52] U.S. Cl. ........................ 348/466; 348/845.1; 348/432
[58] Field of Search ................................... 348/466, 432, 348/472, 390, 473, 434, 465, 426

[56] References Cited

U.S. PATENT DOCUMENTS

| | | | |
|---|---|---|---|
| 5,289,276 | 2/1994 | Siracusa et al. | 348/467 |
| 5,323,236 | 6/1994 | Tichelaar et al. | 358/141 |
| 5,376,969 | 12/1994 | Zdepski | 348/466 |
| 5,455,629 | 10/1995 | Sun et al. | 348/466 |
| 5,461,619 | 10/1995 | Citta et al. | 348/423 |

FOREIGN PATENT DOCUMENTS

| | | | |
|---|---|---|---|
| WO9200648 | 1/1992 | WIPO | H04N 5/782 |
| WO9428678 | 12/1994 | WIPO. | |

OTHER PUBLICATIONS

"A New One–Chip Dataline Processor For the Video Programming System (VPS)", by G. Schippman, IEEE Transactions on Consumer Electronics, vol. CE–33, No. 3, Aug. 1987, pp. 226–229.

"VPS — Ein Neues System Zur Beitragsgesteuerten Programmaufzeichnung" by Von Arthur Heller, Rundfunktechnische Mitteilungen, Jahrgang 29, 1985, Heft 4, pp. 161–169.

"Wide Screen Signalling for EDTV" by Dietrich Westerkamp, Thomson Consumer Electronics Corporate Research, Deutsche Thomson–Brandt GmbH, Hannover, on the 18th International Television Symposium and Technical Exhibition, 10–15 Jun. 1993, pp. 748–754.

Primary Examiner—Victor R. Kostak
Attorney, Agent, or Firm—Edward W. Goodman

[57] ABSTRACT

In a method of decoding a data signal (WSS) having at least a start-code or sync word section (SC) and a data section (AR..R), the data signal is converted (ADC) into a sequence of multi-bit samples having at least a start-code or sync word section (SC) and a data section (AR..R). The sequence of multi-bit samples is processed (11A) to obtain a word sync signal (WS) indicating synchronization information. A disturbance measurement signal (Γ) is obtained (19) from at least the start-code or sync word section (SC) of the sequence of multi-bit samples. Finally, the data section (AR..R) of the sequence of multi-bit samples is code demodulated (13A) in response to the word sync signal (WS) in dependence upon the disturbance measurement signal (Γ) to obtain a demodulated data signal.

11 Claims, 19 Drawing Sheets

| group 1<br>Aspect Ratio AR | group 2<br>Enhanced Services ES |
|---|---|
| 24 elements<br>based on 5 MHz | 24 elements<br>based on 5 MHz |
| bit numbering<br>0 1 2 3<br>LSB    MSB<br>per info bit:<br>'0' = 000 111<br>'1' = 111 000 | bit numbering<br>4 5 6 7<br>LSB    MSB<br>per info bit:<br>'0' = 000 111<br>'1' = 111 000 |

| 3210 | bit number |
|---|---|
| 1000 | full format 4:3 |
| 0001 | letterbox 14:9 centre |
| 0010 | letterbox 14:9 top |
| 1011 | letterbox 16:9 centre |
| 0100 | letterbox 16:9 top |
| 1101 | letterbox >16:9 centre |
| 1110 | full format 4:3 (shoot and protect 14:9 centre) |
| 0111 | full format 16:9 (anamorphic) |

$b_3$ = odd parity bit

| 4 | bit number |
|---|---|
| 0 | camera mode |
| 1 | film mode |

| 5 | bit number |
|---|---|
| 0 | standard PAL |
| 1 | MACP |

| 6 | bit number |
|---|---|
| 0 | no helper |
| 1 | modulated helper |

7    Reserved.
     Shall be set to '0'.

FIG.1B

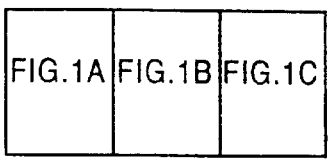
FIG.1D

| group 3 Subtitles ST | group 4 Reserved R |
|---|---|
| 18 elements based on 5 MHz | 18 elements based on 5 MHz |
| bit numbering 8 9 10 LSB MSB per info bit: '0' = 000 111 '1' = 111 000 | bit numbering 11 12 13 LSB MSB per info bit: '0' = 000 111 '1' = 111 000 |
| <table><tr><td>8</td><td>bit number</td></tr><tr><td>0</td><td>no subtitles within Teletext</td></tr><tr><td>1</td><td>subtitles within Teletext</td></tr><tr><td>10 9</td><td>bit number</td></tr><tr><td>0 0</td><td>no open subtitles (SBT)</td></tr><tr><td>0 1</td><td>SBT in active image area</td></tr><tr><td>1 0</td><td>SBT out of act. image area</td></tr><tr><td>1 1</td><td>reserved</td></tr></table> | Reserved. Shall all be set to '0'. |

FIG.1C

METHOD AND APPARATUS FOR DECODING AN ANALOG EXTENDED VIDEO SIGNAL HAVING SIGNALLING INFORMATION INCLUDED THEREIN FOR CONTROLLING THE DECODING OPERATIONS

BACKGROUND OF THE INVENTION

1. Field of the Invention

The invention relates to a method and apparatus for decoding a data signal having at least a start-code or sync word section and a data section, which can be used for decoding signalling information contained in a television signal to control recording or other processing operations, more specifically, for decoding a wide screen signalling signal indicating, for example, the aspect ratio and the origin (i.e., camera or movie film) of a television signal.

2. Description of the Related Art

The article "Wide-Screen Signalling for EDTV", presented by D. Westerkamp on the 18th International Television Symposium and Technical Exhibition, Montreux (CH), 10–15 June 1993, Symposium record pp. 748–754, discloses a wide screen signalling signal which can be transmitted with an extended definition television (EDTV) signal. The article does not disclose any decoder hardware for such a wide screen signalling signal.

The non-prepublished international application WO-A-94/28678, corresponding to U.S. Pat. No. 5,627,592 (attorney's docket PHN 14,478) also discloses a wide screen signalling signal and a decoder for such a signal. The signalling bits comprise a start-code and data bits. The start-code's main lobe of spectral energy resides in the lower spectral area of a baseband television signal, this lower spectral area having a maximum frequency below 2 MHz (preferably, 1.7 MHz). The start code has a local spectral minimum at DC. The start code has good aperiodic correlation properties and a predetermined minimum bit Hamming distance to the data bits when shifted towards or over the data bits following the data bits following the start-code. The signalling bits decoder is preceded by a low-pass filter having a cut-off frequency at the maximum frequency of the lower spectral area. The signalling bits decoder comprises a start-code detector having circuitry to determine whether a first plurality of bits has been correctly received, and whether among a second plurality of bits, at least a predetermined number is free from error.

SUMMARY OF THE INVENTION

It is, inter alia, an object of the invention to provide a practical method and apparatus for decoding a data signal. To this end, a first aspect of the invention provides a method of decoding an extended television signal having signalling information to control decoding operations, the method comprising the steps of converting the extended television signal into a sequence of multi-bit samples; processing the sequence of multi-bit samples to obtain a word sync signal indicating signalling synchronization information; and code demodulating the sequence of multi-bit samples in response to the word sync signal to obtain demodulated signalling data. A second aspect of the invention provides a device for decoding an extended television signal having signalling information to control decoding operations, the apparatus comprising means for converting the extended television signal into a sequence of multi-bit samples; means for processing the sequence of multi-bit samples to obtain a word sync signal indicating signalling synchronization information; and means for code demodulating the sequence of multi-bit samples in response to the word sync signal to obtain demodulated signalling data. A third aspect of the invention provides a method of decoding signalling information contained in a television signal to control recording or other processing operations, the method comprising the steps of converting the television signal into a sequence of multi-bit samples; processing the sequence of multi-bit samples to obtain a word sync signal indicating signalling synchronization information; and code demodulating the sequence of multi-bit samples in response to the word sync signal to obtain demodulated signalling data. A fourth aspect of the invention provides a method of decoding a data signal having at least a start-code or sync word section and a data section, the method comprising the steps of converting the data signal into a sequence of multi-bit samples having at least a start-code or sync word section and a data section; processing the sequence of multi-bit samples to obtain a word sync signal indicating synchronization information; obtaining a disturbance measurement signal from at least the start-code or sync word section of the sequence of multi-bit samples; and code demodulating the data section of the sequence of multi-bit samples in response to the word sync signal in dependence upon the disturbance measurement signal to obtain a demodulated data signal. A fifth aspect of the invention provides a video signal receiving apparatus for processing a video signal including a data signal portion having at least a start-code or sync word section and a data section, the apparatus comprising means for converting the data signal into a sequence of multi-bit samples having at least a start-code or sync word section and a data section; means for processing the sequence of multi-bit samples to obtain a word sync signal indicating synchronization information; means for obtaining a disturbance measurement signal from at least the start-code or sync word section of the sequence of multi-bit samples; means for code demodulating the data section of the sequence of multi-bit samples in response to the word sync signal in dependence upon the disturbance measurement signal to obtain a demodulated data signal; means for processing the video signal in dependence upon the demodulated data signal to obtain a processed video signal; and means for displaying or recording the processed video signal.

In accordance with one aspect, the invention provides a method of decoding a data signal having at least a start-code or sync word section and a data section, in which the data signal is converted into a sequence of multi-bit samples having at least a start-code or sync word section and a data section. The sequence of multi-bit samples is processed to obtain a word sync signal indicating synchronization information. Preferably, a disturbance measurement signal is obtained from at least the start-code or sync word section of the sequence of multi-bit samples. Finally, the data section of the sequence of multi-bit samples is code demodulated in response to the word sync signal, and preferably, in dependence upon the disturbance measurement signal, to obtain a demodulated data signal.

A primary application of this invention concerns a new concept of a wide screen signalling decoder. Wide screen signalling (WSS) is used in 625-line television systems to transfer status information concerning the actual content of the signal to a television receiver. It is transmitted once per frame in the first half of line 23 of a composite video baseband signal (CVBS).

The WSS signal contains a run-in, start-code and bi-phase code modulated data. The main energy of the WSS signal is in the lower video spectral domain, which is 0–1.7 MHz, although the design of the signal is based on a 5 MHz clock.

In a preferred embodiment, the new decoder concept differs from conventional ones in that it does not use the run-in for a phase-locked loop (PLL) to gain acquisition and lock, it does not use the start-code to detect the WSS signal in line 23 and it does not establish a measure of data reliability by checking on bi-phase code violations. The preferred embodiment of the new decoder concept does use the tail of the run-in and start-code for timing estimation, it does perform bi-phase code demodulation of the bi-phase encoded data, and the data reliability is estimated by comparing the data samples with a threshold level. This threshold is determined by a measure of RMS disturbance. A measure of data reliability is used to determine whether or not there is a WSS signal in line 23.

Simulations and measurements have shown that this new concept of a WSS decoder is very robust to multiple transmission impairments which are encountered in a television channel (terrestrial, cable and satellite). This new concept WSS decoder performs quite well even when a VHS or SVHS consumer type video recorder (VCR) is used for recording and replay of the signal, which probably is representative for the worst channel.

These and other aspects of the invention will be apparent from and elucidated with reference to the embodiments described hereinafter.

BRIEF DESCRIPTION OF THE DRAWINGS

In the drawings,

FIGS. 1A–1C show a WSS status bits transmission scheme, while FIG. 1D shows hows FIGS. 1A–1C should be combined;

DESCRIPTION OF THE PREFERRED EMBODIMENTS

1. Introduction

Wide screen signalling (WSS) is used in 625-line television systems to transfer status information concerning the actual content of the signal to a television receiver. PALplus requires WSS because a PALplus television receiver has to be signalled whether it receives PALplus or not. It is obvious that WSS has also add-on value to non PALplus broadcasts.

The WSS status information includes the aspect ratio (4:3, 16:9, . . . ), enhanced services (camera/film mode, . . . ), subtitles (where they are located) and some bits which are reserved for future use. WSS transfers a total of 13 information bits and one parity bit once per frame (40 ms). This parity bit is supposed to give extra protection to the aspect ratio information only. Note that no parity bits are added to all the information bits for error detection or correction. One of the reasons for the lack of parity bits is that the reliability of the information can be estimated by use of a kind of erasure detection technique or, more in detail, a data modulation code violation detection technique which does not cost extra bits (extra time).

Figure 1A:
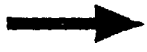

The WSS signal is put into the first half of line 23 of the composite baseband video signal (CVBS) and has a total duration of 27.4 $\mu$s. FIGS. 1A–1C, combined as shown in FIG. 1D, show the WSS status bits transmission scheme in detail. A bi-phase modulation coded info bit consists of 6 elements based on a 5 MHz clock. The duration T of each element is 200 ns.

Figure 2:
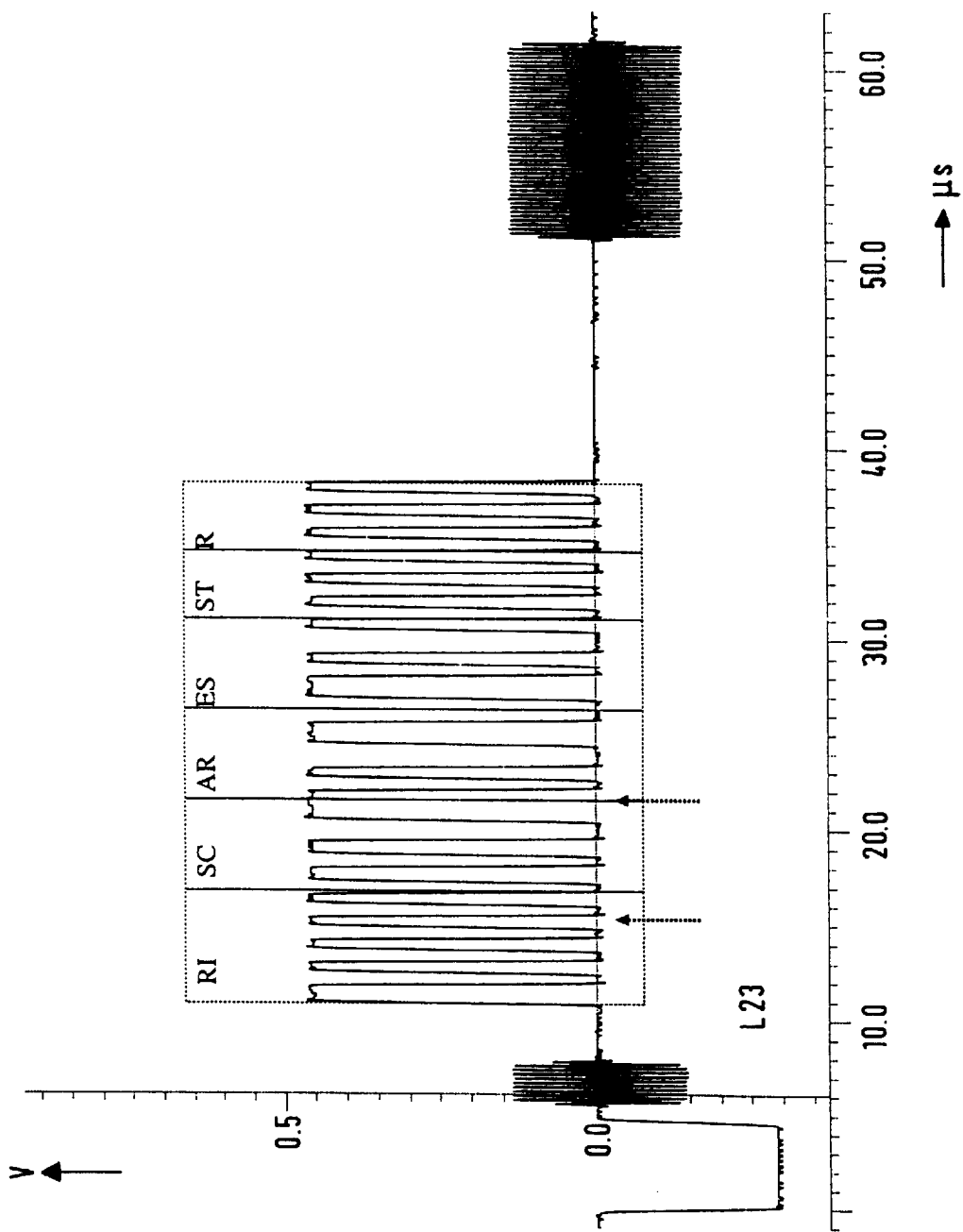
FIG. 2 shows a received CVBS line 23 with WSS data.
Figure 3:
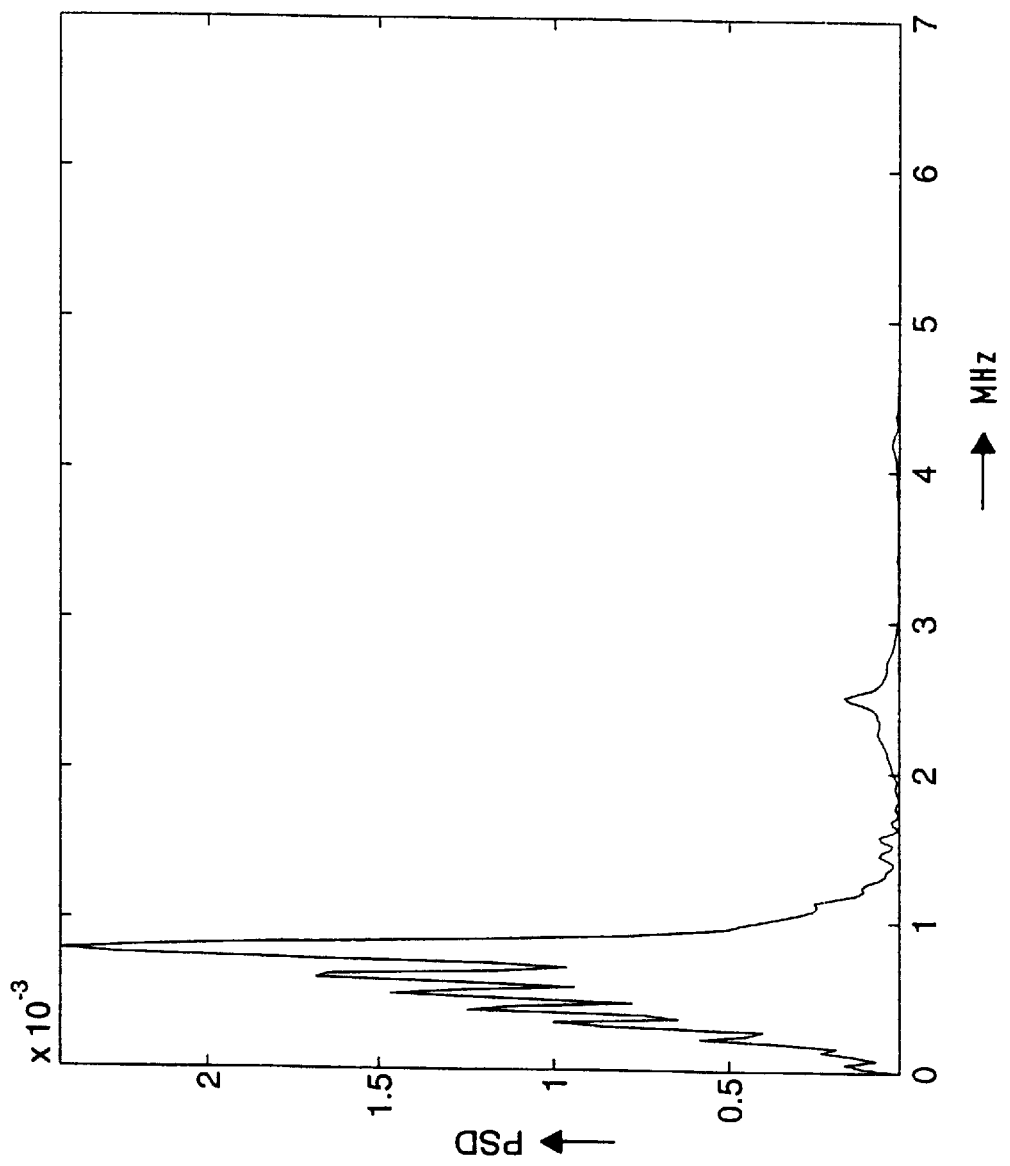
FIG. 3 shows a PSD of a WSS signal versus frequency.

The WSS signal contains a run-in, start-code and bi-phase encoded data. The main energy of the WSS signal, about 94%, is in the lower video spectral domain, which is 0–1.7 MHz, although the design of the signal is based on a 5 MHz clock. This is shown in FIGS. 2 and 3 which present the WSS signal in line 23 and the power spectral density (PSD) of the WSS signal, respectively. Note that the PSD of the WSS signal has been derived in such a way that its DC-contents is zero (by subtracting 0.25 Volt and proper windowing).

FIG. 2 shows line 23 (L23) of a 625 line PAL TV signal, voltage in Volts against time in $\mu$s. The WSS signal contains a run-in RI, a startcode SC, aspect ratio bits AR, enhanced services bits ES, sub-title bits ST, and reserved bits R as set out in more detail in FIGS. 1A–1C.

FIG. 3 shows the PSD of a WSS signal against the frequency in MHz.

In the preferred embodiment, the new decoder concept differs from conventional ones in that it does not use the run-in for a phase-locked loop (PLL) to gain acquisition and lock (clock recovery), it does not use the start-code to detect the WSS signal in line 23 and it does not establish a measure of data reliability by checking on biphase code modulation errors or violations. The earlier mentioned conventional decoder types are related strongly to the concept of those that are used, for instance, for the video programming system (VPS). This relation exists because the design of the WSS signal has strong similarities with the VPS signal, i.e., based on 5 MHz clock, 0.5 Volt top-top amplitude, bi-phase code modulated data, etc. The VPS system has been described in detail in the articles "VPS—Ein neues System zur beitragsgesteuerten Programmaufzeignung, by Arthur Heller, in Rundfunktechnische Mitteilungen, Jahrg. 29, H. 4, 1985, pp. 161–169, and "A new one-chip dataline processor for the video programming system (VPS)", by G. Schippmann, IEEE Trans. on Consumer Electronics, Vol. CE-33, No. 3, August 1987, pp. 226–229.

Now the question rises: What does the new WSS decoder concept do? This question will be the subject of the next sections which will give a detailed outline of the new WSS decoder concept and its performance with regards to several transmission impairments, including VCRs. But first, we will focus on a conventional decoder concept.

2. Conventional decoder concept

Figure 4:
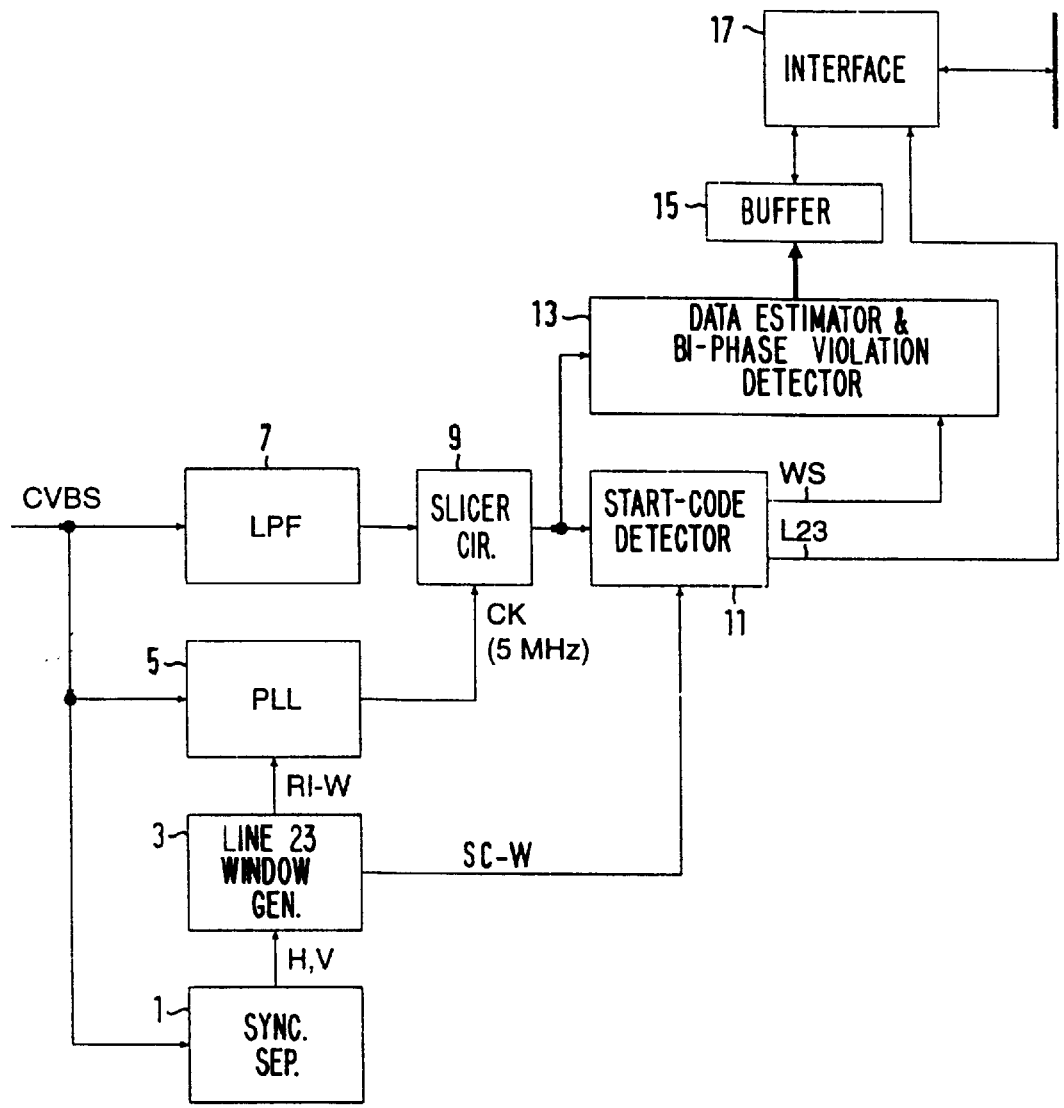
FIG. 4 shows a conventional WSS decoder.

FIG. 4 shows a schematic block diagram of a conventional WSS decoder concept, corresponding to that described in the non-prepublished international application WO-A-94/28678, corresponding to U.S. Pat. No. 5,627,592 (attorney's docket PHN 14,478), incorporated by reference herein. The input CVBS is led into three branches.

In the lower branch, the CVBS is put into a sync separator 1. The sync separator outputs a H,V sync that is input to a line 23 windows generator 3. This line 23 windows generator 3 has two outputs: a run-in window RI-W and a start-code window SC-W.

The middle branch contains a PLL 5. This PLL 5 has a voltage controlled clock (VCC) with a frequency of 5 MHz. The run-in window RI-W is used to increase the PLL's lock speed during the run-in. This is common practice. The PLL 5 outputs a 5 MHz sample clock signal CK that will be locked to the input line 23 WSS CVBS.

The upper branch contains an optional low-pass filter (LPF) 7. This filter 7 is not critical. A preferred implementation is one which preserves the spectral energy of the signal below 1.67 MHz. The filtered CVBS is the input of a hard slicer circuit 9. The output of the hard slicer 9 is sampled with the 5 MHz PLL clock. The sampler 9 outputs a bit stream with a 5 Mbit/s rate.

The bit stream is put into two branches. The first branch contains a start-code detector 11. Its function is to detect whether a sequence of bits matches some kind of start-code detection criterion and, if found, to give a line-23-WSS-detected signal L23 and a word sync signal WS.

The second branch leads the bit stream into a data estimator and bi-phase violation detector 13. This circuit 13 is triggered by a word sync WS of the start-code detector 11. Each received information bit consists of a word of 6 bits (5 MHz clock). This word is split into two nibbles of three bits each. The data is estimated by applying, for instance, a majority decision on the first nibble. The bi-phase violation detection is established by comparing the majority decisions of both nibbles each. It is obvious that a bi-phase code violation flag is set if the results of the two decisions are equal.

If line 23 WSS has been detected, 14 data bits and 14 corresponding violation flags are written into a buffer 15. Via an interface 17 (e.g., IIC), this information is available to the outer world.

The information contains an intrinsic measure of the quality of the channel, i.e., WSS in line 23 detected, bi-phase violation flags and the parity of the aspect ratio. On the basis of this information, a television receiver will determine a strategy for the further processing of this information. This will result in a status switching as indicated by the WSS information, where, of coarse, the speed of switching is determined by the quality of the channel and some physics laws with reference to, for instance, high voltage CRT's in case of aspect ratio switching.

3. The new WSS decoder concept

Figure 5:
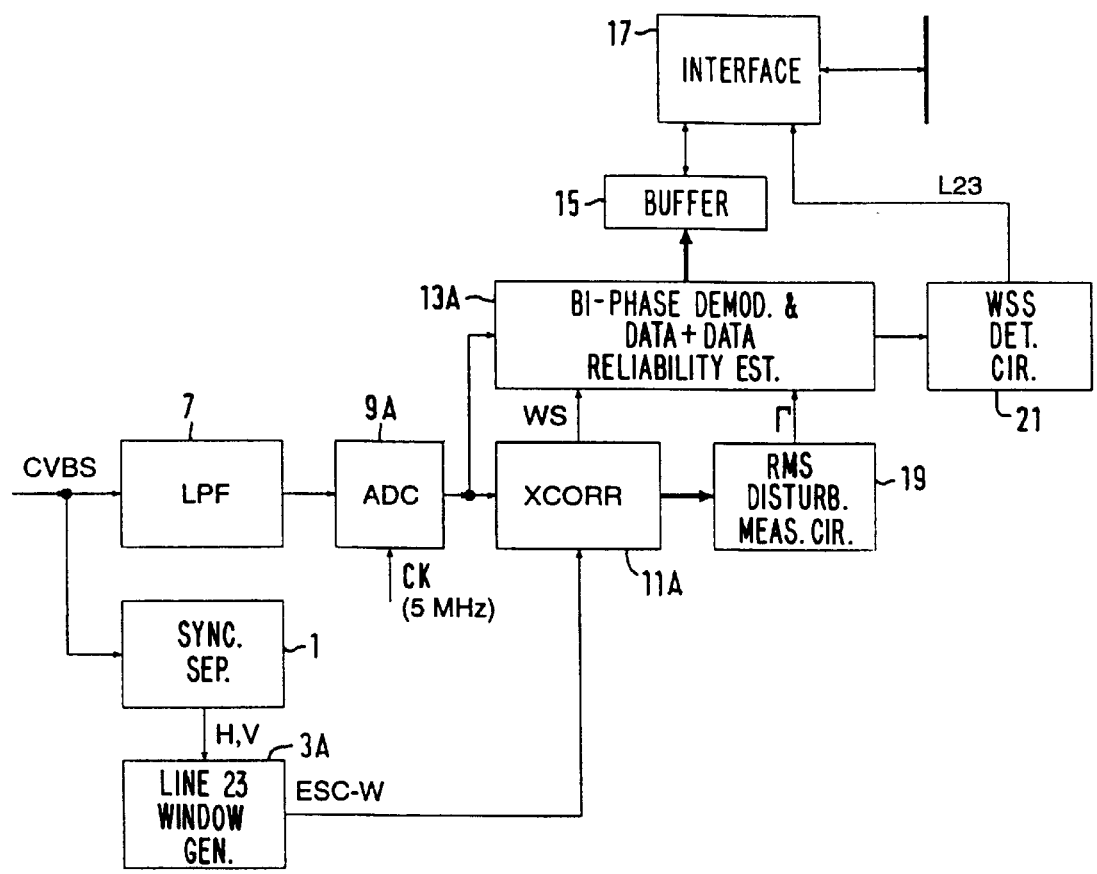
FIG. 5 shows a preferred embodiment of the new WSS decoder concept.

A preferred embodiment of the new WSS decoder concept is shown in FIG. 5. Like the conventional decoder, the new WSS decoder has means to select line 23 and to generate some WSS related windows. It has also a buffer and interface. However, a PLL is missing because a fixed frequency clock (5 MHz) is used. It contains an A/D converter 9A instead of the hard slicer 9 of FIG. 4, to make soft decoding possible. Soft decoding is known as such from A. M. Michelson and A. H. Levesque, "Error-control techniques for digital communications," John Wiley & Sons, 1985, from T. R. N. Rao and E. Fujiwara, "Error-control coding for computer systems," Prentice-Hall, 1989, and from J. G. Proakis, "Digital communications," second edition, McGraw-Hill Book Co., 1989. Furthermore, the algorithms for word sync and data and data reliability estimation are much different. Now, let us focus in detail on this new concept.

The optimal low-pass filter 7, with respect to noise performance, is, in this case, a replica of the elementary pulse that has been used at the encoder. E.g., its impulse response is $$h(t)=1/T\cdot\cos^2(\pi t/(2T)) \quad (1)$$

for $|t| \leq T$ $$h(t)=0$$

for $|t| > T$ where T=200 ns. In practice, this filter 7 is preceded by a video low-pass filter with a cut-off frequency of about 5 MHz (B,G/PAL). The line 23 window generator 3A produces a window ESC-W for an extended start-code ESC. This so called extended startcode ESC is the tail of the run-in RI combined with the start-code SC (see FIGS. 1,2) as explained in the non-prepublished international application WO-A-94/28678, corresponding to U.S. Pat. No. 5,627,592 (attorney's docket PHN 14,478), and consists of 30 samples, i.e., $$v_{esc}=[-,-,-,+,+,+,-,-,-,+,+,+,+,-,-,-,+,+,+,+,-,-,-,-,-, +,+,+,+,+] \quad (2)$$

in binary notation, where "+" represents +1, and "−" means −1. This extended start-code ESC has better correlation properties than the startcode SC itself. The extended start-code window ESC-W should be widened in order to include some timing tolerance of the Hsync in case of heavily disturbed channels with reference to horizontal timing (recording and replay of VHS and SVHS recorders). As soon as the window ESC-W is active, the received signal is cross-correlated with a replica of this extended startcode by an extended start-code cross-correlator 11A. Such a cross-correlation circuit 11A is shown in detail as a part of FIG. 6. The timing reference of WSS in line 23, i.e., word sync WS, is estimated by triggering on that sample that results in the highest correlation peak (global maximum). The accuracy of this estimate will be $\pm 1/(2f_s)$, where $f_s$ is the sample frequency, in case of a non disturbed channel. E.g., in case of a 5 MHz clock, the uncertainty in the estimate will be ±100 ns. Interpolation, like, for instance, linear or cubic, or use of a PLL instead of a fixed clock can improve the accuracy of the timing estimate. However, minor improvement in decoder performance should be expected from an increased timing accuracy because the input signal is over-sampled. Note that at this stage, it has not yet been detected whether we have WSS in line 23 or not.

Now we have the timing relation, the data bits are bi-phase code demodulated by a bi-phase demodulator and data plus data reliability estimator 13A to produce the 14 bits and 14 violation flags. An RMS disturbance measurement circuit 19 applies a threshold Γ to the demodulator 13A on the basis of information received from the cross-correlator 11A. A line 23 WSS detection circuit 21 supplies the detection signal L23 to the interface 17 in response to information received from the demodulator 13A.

Figure 7:
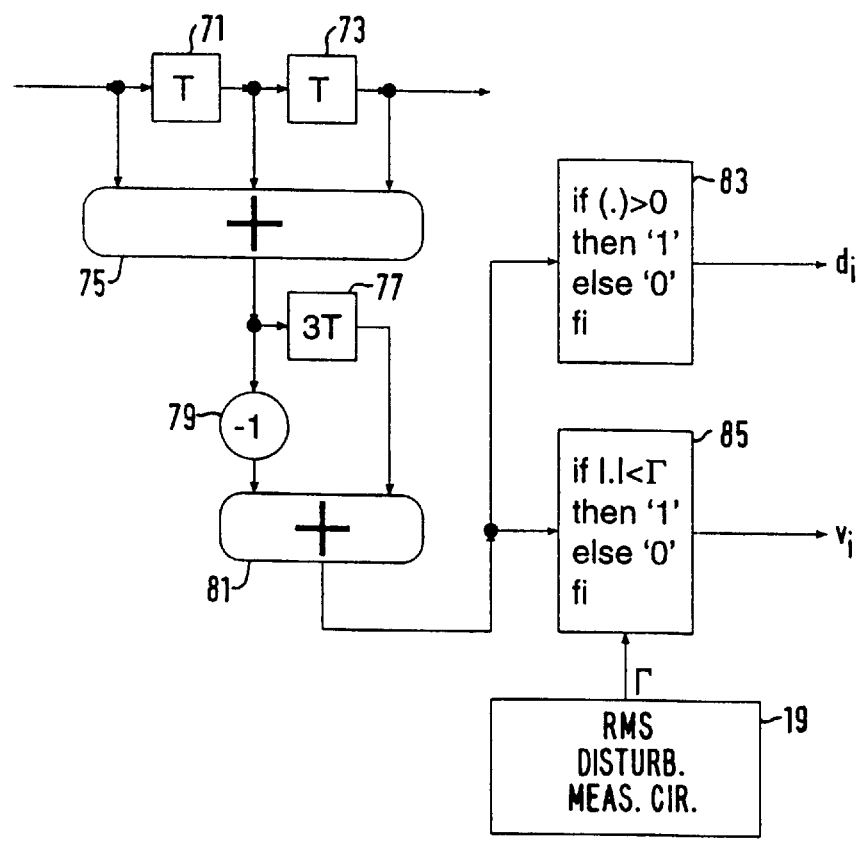
FIG. 7 shows a data and data reliability estimation.

The process of demodulation carried out by the demodulator 13A is shown in FIG. 7. Note that although single lines are shown, a multi-bit processing is performed so as to increase the reliability by making an optimum use of the signal energy in the WSS signal. Each bi-phase coded data bit consists of 6 bytes. The 6 bytes are separated into two nibbles of 3 bytes each. The sum of the bytes in each nibble is calculated. To this end, the input bits are applied to a delay line of two delay cells 71, 73 each delaying over the duration T of one byte. The input of the delay cell 71 and the outputs of the delay cells 71, 73 are applied to an adder 75. In accordance with the invention, any noise is reduced as a consequence of this addition of multi-bit data, resulting in an integration of the energy in the received data, whereby the accuracy depends on the number of bits assigned to each sample by the A/D converter 9A. Previously, a majority decision was carried out on three successive sliced bits which is far less effective in diminishing the effects of noise on the reliability of the decoding process.

Figure 6:
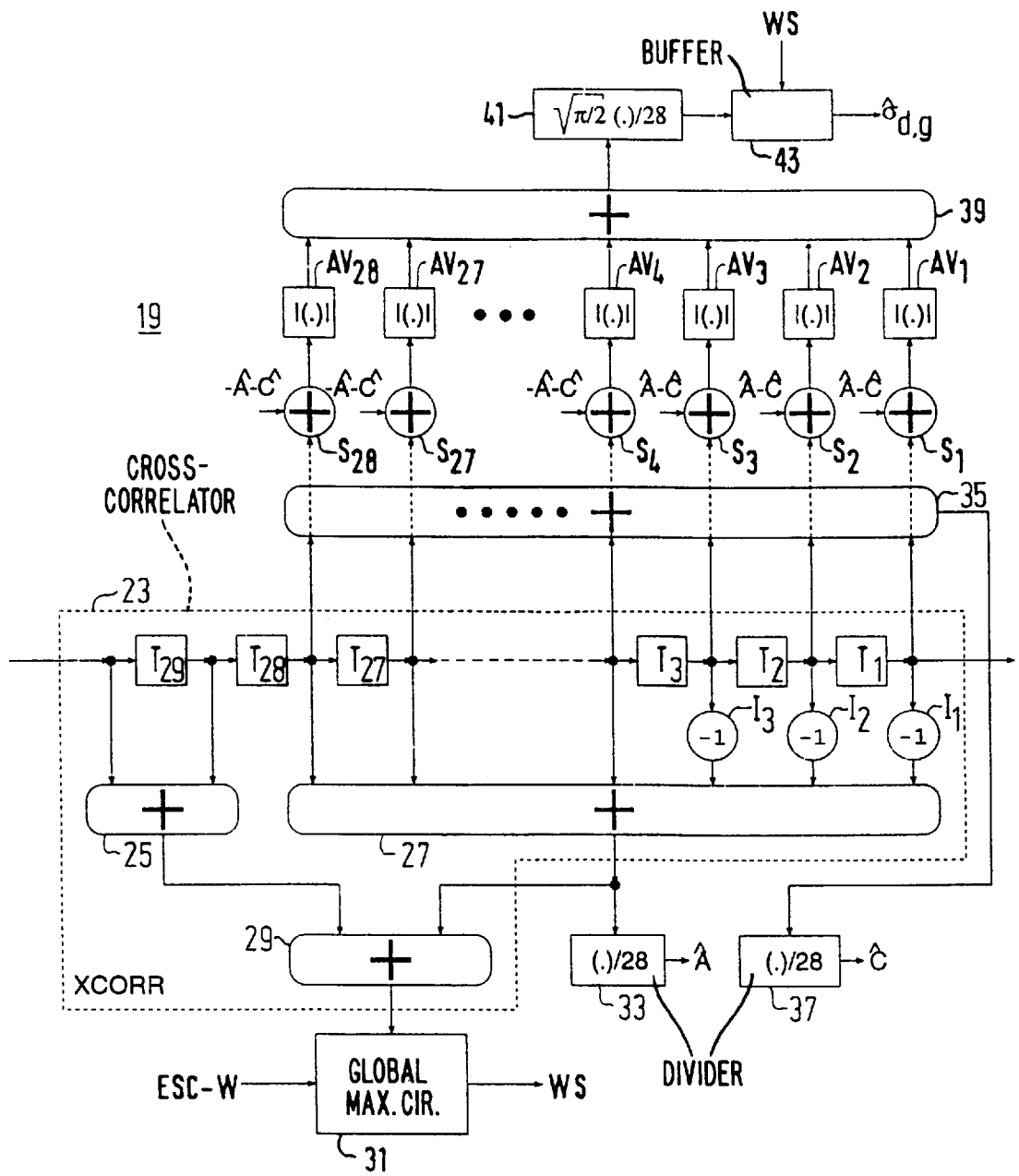
FIG. 6 shows a cross correlator and RMS disturbance meter.

The data is estimated by subtracting the second nibble from the first nibble. To this end, the output of the adder 75 is delayed over 3T by a delay circuit 77 and inverted by an inverter 79. The outputs of the delay circuit 77 and the inverter 79 are applied to an adder 81. The sign of the result is the data estimate. To determine this estimate, the output of the adder 81 is applied to a first logic circuit 83 which says that if the output exceeds 0, the data bit $d_i$ is "1", while the data bit is "0" in the other case. A second logic circuit 83 determines a violation flag $v_i$ in response to the output of the adder 81. If the output falls below the threshold $\Gamma$, the violation flag $v_i$ is "1", while the violation flag is "0" in the other case. Now, let us focus on how we make an estimation of the reliability of the data, which process is shown in FIG. 6, in order to obtain the threshold $\Gamma$.

Let us return to the point where we found the word sync WS. At that point, we have a good match between the received extended start-code $r_{esc}$, and the replica $v_{esc}$, in the receiver. The received extended start-code can be modelled by the following equation:

$$r_{ecs} = s_{esc} + d \qquad (3)$$

where $$s_{esc} = A \cdot v_{esc} + C,$$

where A represents the amplitude and C the common level, and d is representative for the disturbance in the channel which includes items like inter-symbol interference (ISI), noise, co-channel interference (CCI), single carrier interference, etc. CCI has been discussed in S. Dinsel and E. Sipek, "Frequency offset in television—theory and application," Reprinted from the EBU Review—Technical, No. 210, April 1985.

How can we derive an estimate of the disturbance? This can be achieved by subtracting the replica from the received signal. Of course, the amplitude and the common level should be estimated first before the subtraction can actually take place. Furthermore, we take a DC-free subset of the extended start-code, which consists of 28 samples, in order to make the calculation of amplitude very simple, i.e., $$v_{esc\ DC-free} = [-,-,-,+,+,+,-,-,-,+,+,+,+,-,-,-,+,+,+,+,-,-,-,-,-,+,+,+] \qquad (4)$$

in binary notation. It appears that the last two "+" symbols of the extended start-code given in (2) are left out in (4). The amplitude, A, is estimated by applying the following formula:

$$A = (v_{esc\ DC-free} \cdot r_{esc\ DC-free})/28 \qquad (5)$$

The common level, C, is estimated by applying:

$$\hat{C} = \frac{\sum_{i=1}^{28} r_{esc\ dc-free_i}}{28} \qquad (6)$$

The replica that will be subtracted, is an estimate of the received signal and is given by:

$$s = A \cdot v_{esc\ DC-free} + C \qquad (7)$$

The estimate of disturbance follows from:

$$d = r_{esc\ DC-free} - s \qquad (8)$$

A good estimate of the RMS disturbance is derived by:

$$\hat{\sigma}_d = \frac{\sum_{i=1}^{28} |\hat{d}_i|}{28} \qquad (9)$$

The quality of this estimate of RMS disturbance can be expressed by its probability density function (PDF) if the disturbance has a stochastic character. Knowledge about the PDF of the disturbance is not important, according to the central limit theory, as long as the $d_i$ have the same PDF and are not correlated. The PDF of $\sigma_d$ is approximately a Gaussian distribution with mean $\sigma_{|d|}$ and variance $\sigma_{|d|}^2/28$. Note that ISI, which is also introduced by a timing error, will increase the RMS disturbance. The bigger the timing error, the bigger the RMS disturbance. This is desirable.

If we assume that the major disturbance will be added white Gaussian noise (AWGN), then we can apply this knowledge into equation 9. As a result, we acquire the following expression:

$$\hat{\sigma}_{d,G} = \sqrt{\frac{\pi}{2}} \frac{\sum_{i=1}^{28} |\hat{d}_i|}{28} \qquad (10)$$

where the mean and variance of estimate $\sigma_{d,G}$ are related directly to the variance of the $d_i$, i.e., mean is equal to $\sigma_d$ and variance is $\pi \sigma_d^2/(2 \cdot 28)$.

At this point, we have an estimate of the RMS disturbance. From the RMS disturbance, the threshold level $\Gamma$ is derived.

$$\Gamma = z \cdot \sigma_{d,G} \qquad (11)$$

where $\sigma_{d,G}$ has been derived by using equation 10, and z is a constant. A good practical value of z is 2. This threshold level is used to estimate the reliability of each data bit, as is shown in FIG. 7. If the absolute value of a data sample is within this threshold level, then the corresponding violation flag is set, else this violation flag is reset. We have acquired at this stage 14 data bits and 14 corresponding violation bits.

Now we come to the point that we can answer the question: Is there WSS in line 23 or not? The following strategy is used. We count the number of violation flags. Suppose that this number is equal to v. If $v \leq n$, where n is an element of $\{0, 1, \ldots, 7\}$ then WSS is detected in line 23, else not. A practical value for n is 3. This WSS detection strategy can be combined with a check on the parity of the aspect ratio bits.

In FIG. 6, the above theory has been implemented as follows. The multi-bit output signal of the A/D converter 9A of FIG. 5 is applied to a proper cross-correlator 23 which includes a delay line of 29 delay cells $T_1 \ldots T_{29}$, whose 30 taps correspond to the 30 symbols of the full extended start-code ESC. Cross-correlation is effected by inverting (by means of inverters I1, I2, I3, ...) all taps which are supposed to supply negative symbols in the extended start-code when the extended startcode is indeed there. An adder 27 sums 28 taps corresponding to the 28 symbols of the DC-free extended start-code, while an adder 25 sums 2 taps corresponding to the remaining 2 symbols of the 30 symbol full extended start-code. An adder 29 sums the outputs of the adders 25, 27. A global maximum finding circuit 31, enabled by the extended start-code window signal ESC-W, supplies the word sync signal WS at the instant that the received string of symbols matches the symbol string of the extended start-code.

The amplitude A is obtained in accordance with equation 5 by dividing the output of the adder 27 by the value 28 in a divider 33. The common level C is obtained in accordance with equation 6 by an adder 35 which sums the 28 taps of the delay line $T_1 \ldots T_{27}$ without inverting the taps corresponding to the negative symbols in the extended start-code, and a divider 37 which divides the output of the adder 35 by the value 28.

The sum of the amplitude A and the common level C (see equation 7) is subtracted from the 28 taps of the delay line $T_1 \ldots T_{27}$ (see equation 8) by subtracters $S_1 \ldots S_{28}$, whose outputs are applied to respective absolute value determining circuits $AV_1 \ldots AV_{28}$ to obtain the $|d_i|$ values in equation 9. These $|d_i|$ values are summed by an adder 39, whose output is applied to an arithmetic circuit 41 to obtain $\sigma_{d,G}$ in accordance with equation 10. The output of the arithmetic circuit 41 is applied to a buffer 43 which is synchronized by the word sync signal WS.

In this section we showed and explained, in detail, a preferred embodiment of a new concept WSS decoder. A high accuracy and a reduction of noise are obtained thru the shown integration of the energy in the multi-bit signals instead of by using simply sliced signals. The determination of the disturbance as illustrated in FIG. 6 results in a very useful indication of the reliability of the received data, as for each data bit $d_i$, a violation flag $v_i$ is determined in dependence upon the determined disturbance.

Figure 9:
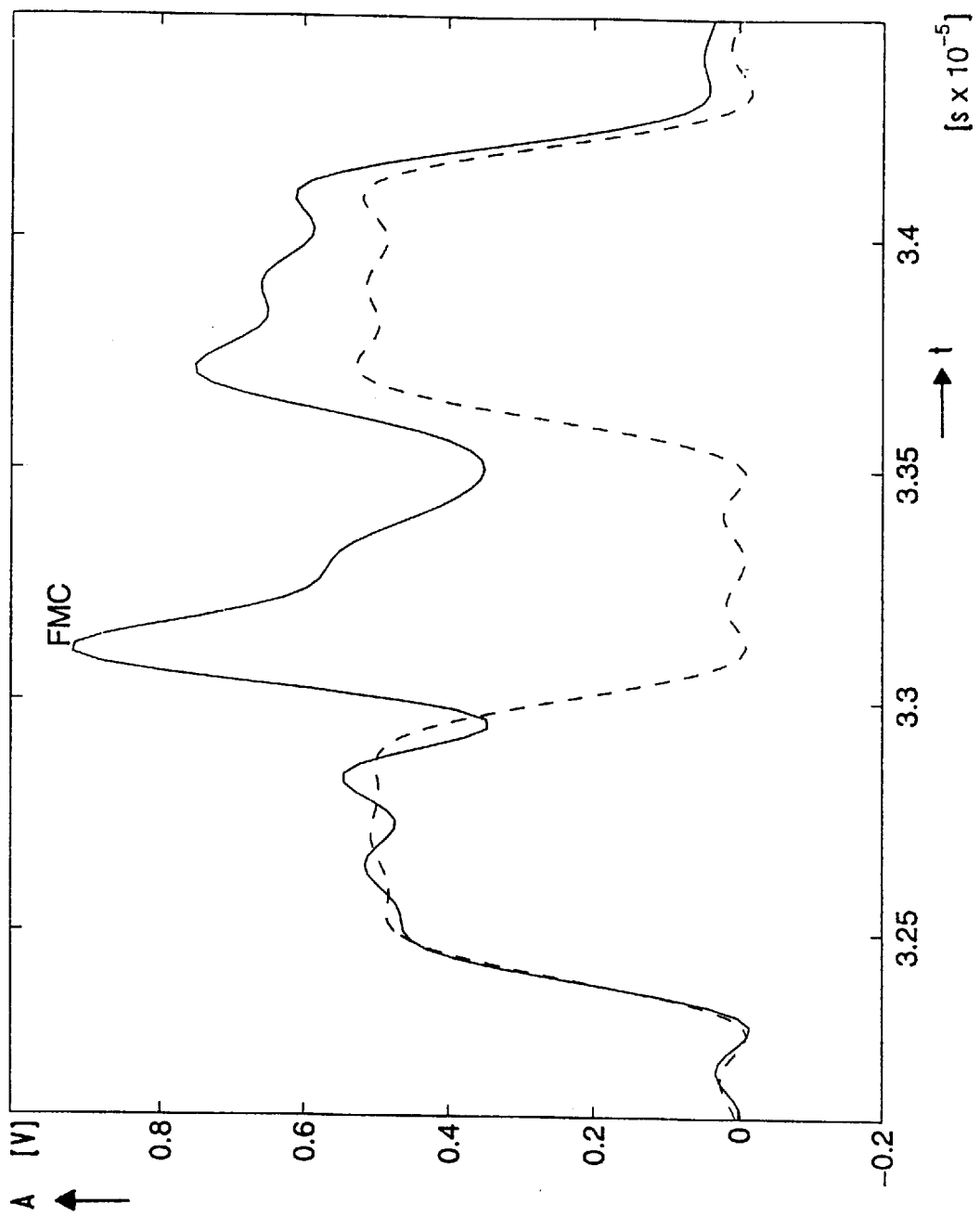
FIG. 9 shows an FM-click in a WSS signal in an input CVBS signal.
Figure 10:
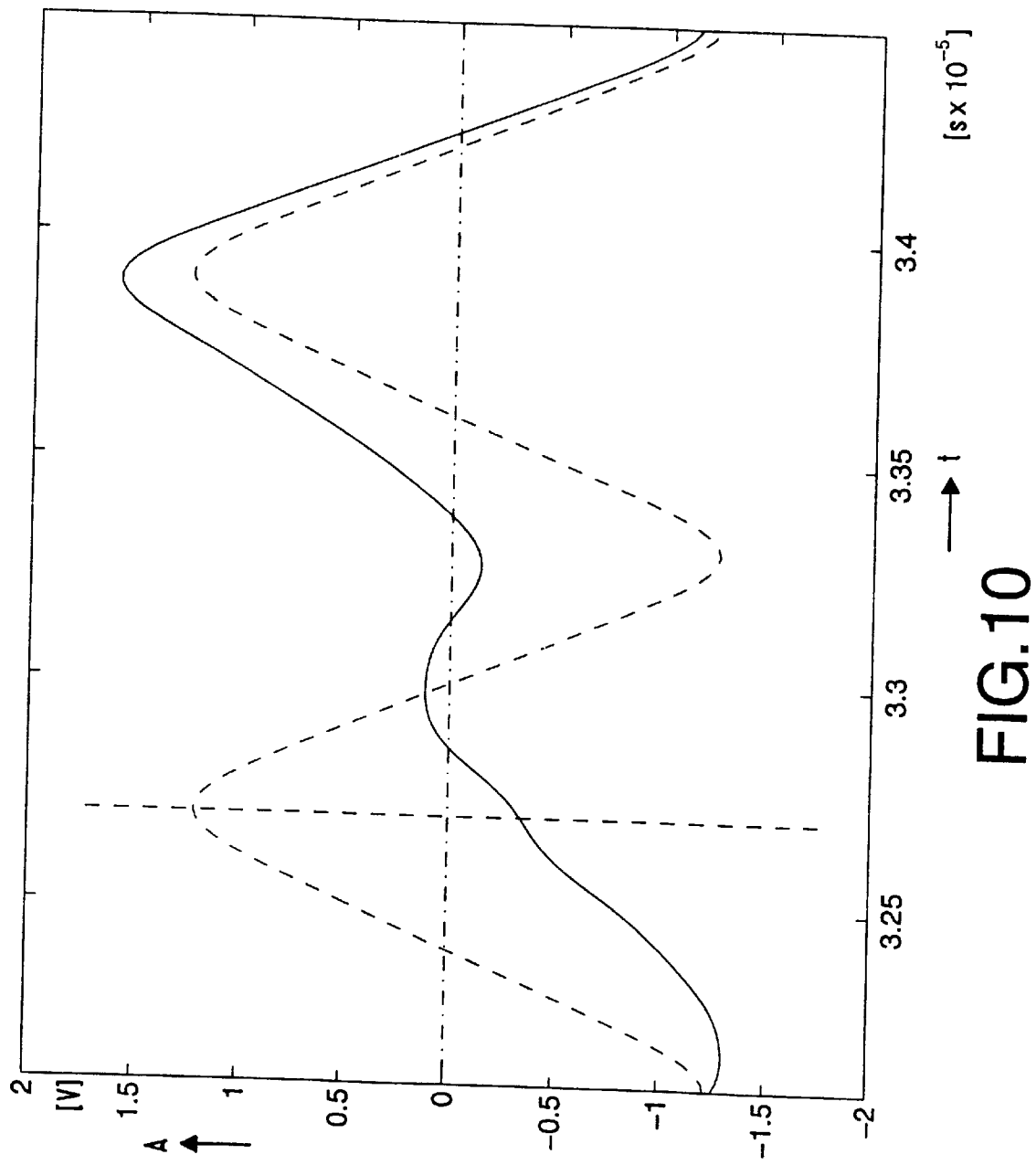
FIG. 10 shows an FM-click in a WSS signal after bi-phase code demodulation.

4. Extension of the new WSS decoder: Circuit for protection against FM-clicks or spike noise Let us start by explaining how an FM-click (or spike noise) can disturb a WSS signal. In FIG. 9, an example is given. It shows an FM-click FMC which affects bit no. 9 of the WSS signal (solid curve). The information that is supposed to be transferred by bit no. 10 is a 1 (dashed curve). If we apply low-pass filtering and proceed with bi-phase code demodulation, then it is shown by FIG. 10 that a 0 (solid curve) is estimated at the receiver instead of the transmitted 1 (dashed curve). If the received signal is not or minor disturbed by other kinds of impairments, then the disturbance threshold level is very small. Hence, it is likely that this error is not marked with a violation flag and therefore can cause impropriate switching in the TV receiver. We like to have means to prevent this impropriate switching.

Figure 8:
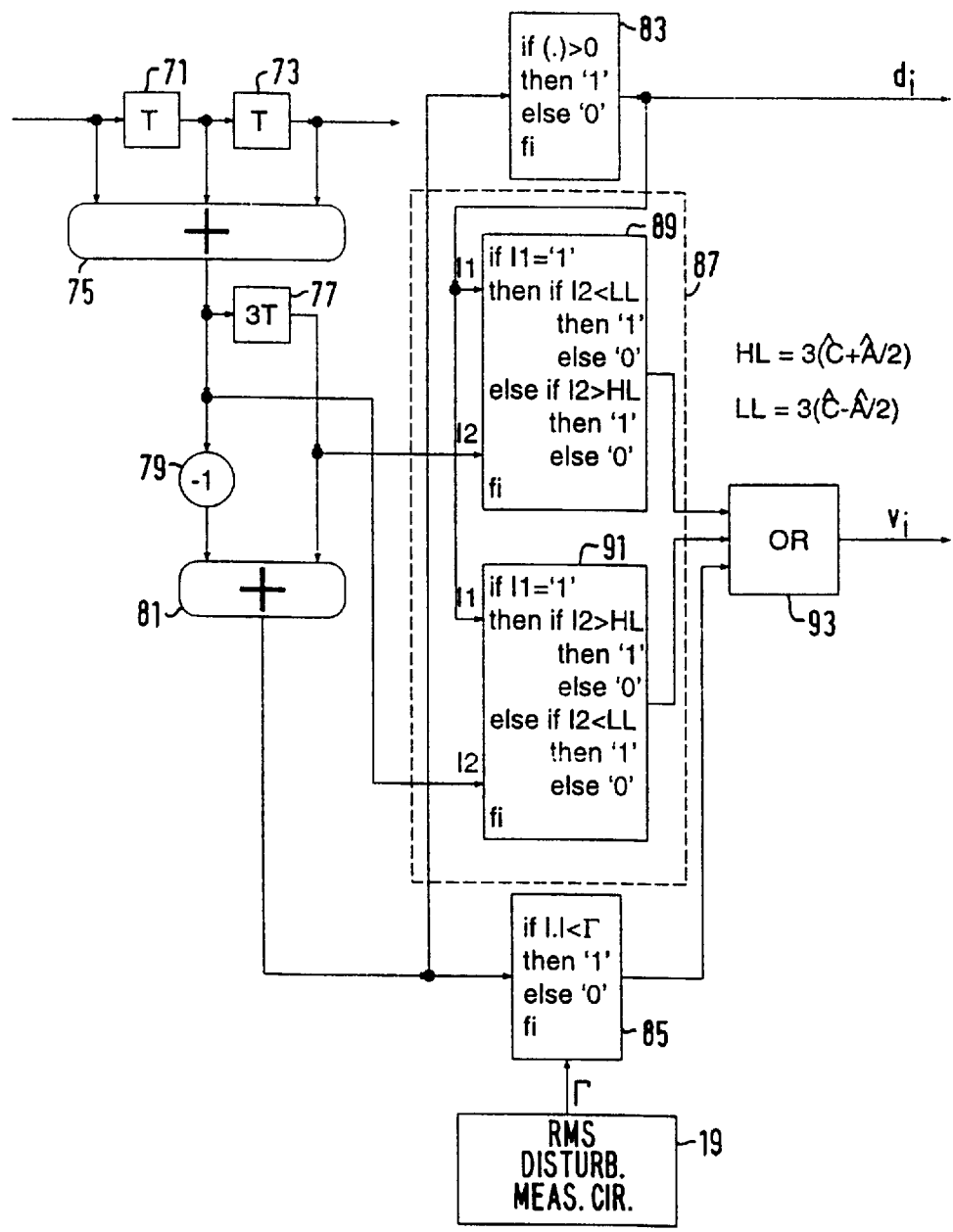
FIG. 8 shows a data and data reliability estimation with check on FM-clicks or spike noise.
Figure 11:
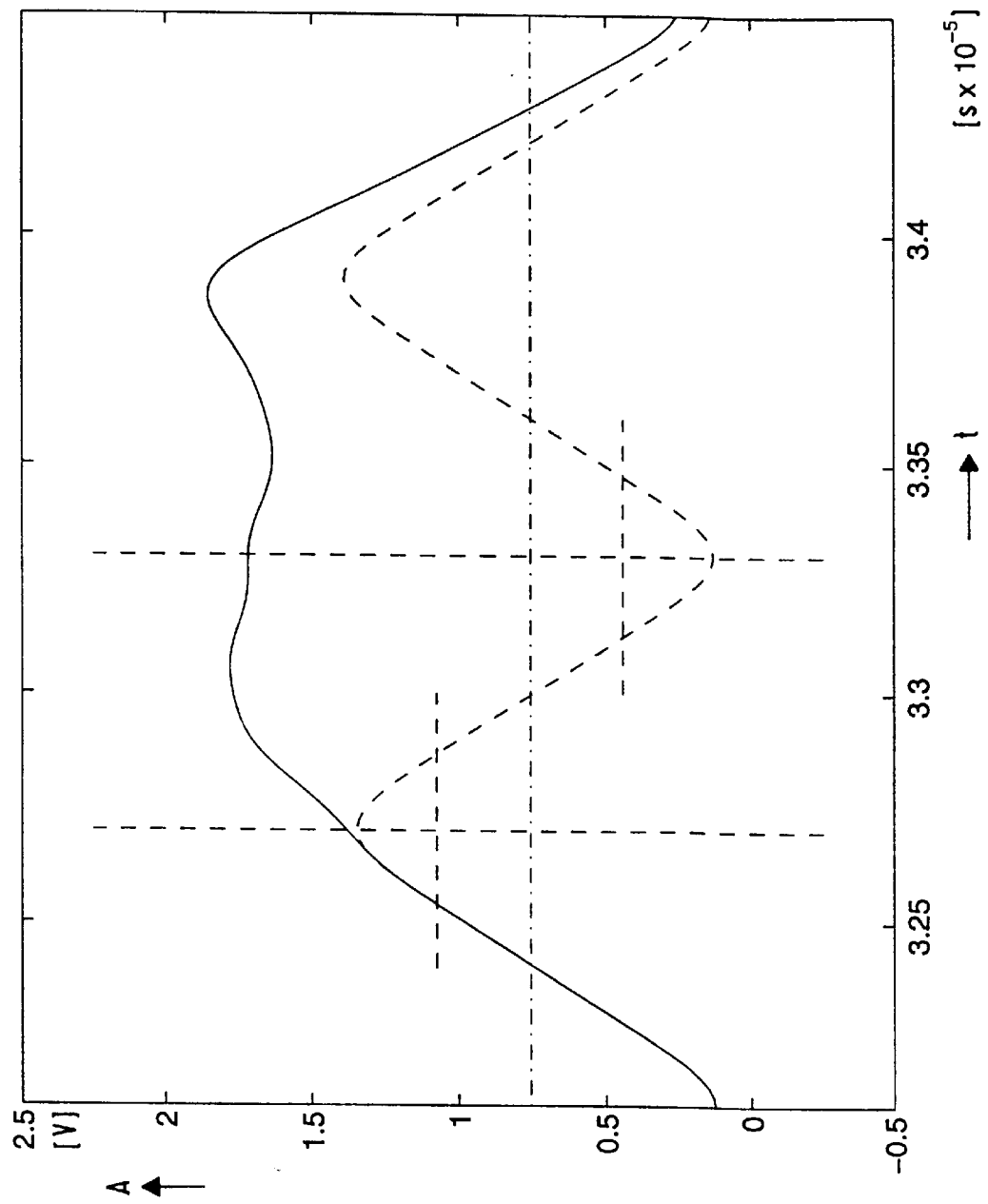
FIG. 11 shows an FM-click in a WSS signal halfway the bi-phase code demodulation process.

A block schematic of an implementation that can detect, or better, mark the occurrence of an FM-click, is shown in FIG. 8. Its operation will be explained with help of the example in FIGS. 9, 10 and 11. First, the data bit, which is, in this example data bit no. 9, is estimated (see FIG. 10), just like in the embodiment of FIG. 7. This data estimation result $d_i$ is fed to inputs I1 of the FM-click detector 87. From the bi-phase demodulator, two intermediate results (output and input of the delay circuit 77, respectively) are fed to inputs I2 of the upper and lower box 89, 91 of the FM-click detector 87, respectively. These two intermediate results can be regarded as the corresponding results of amplitude summation (integration of energy) of the two half symbols which make the bi-phase code. In this example, data bit no. 9 has been estimated as a 0, so I1=0. Therefore, the FM-click detector 87 will proceed with the following tests (i.e., the else parts of the logical statements in the boxes 89, 91):

If the first intermediate result I2 (output 77) is greater than HL (high level), then the upper box 89 outputs a 1, else 0. Result in this example: 1.

If the second intermediate result I2 (input 77) is less than LL (low level), then the lower box 91 outputs a 1, else 0. Result in this example: 0.

In this example, one of the two boxes in the FM-click detector outputs a 1. This means that an OR circuit 93 receiving the outputs of the upper and lower boxes 89, 91 of the click detector 87, and the output of the logical circuit 85 has at least one "1" input, so that violation flag no. 9 will be set which marks bit no. 9 as being unreliable.

In the implementation, HL and LL have been chosen equal to 3(C+A/2) and 3(C−A/2), respectively, This is not strictly required, but preferred.

In the next sections we proceed with simulation and measurement results on the performance of the new concept WSS decoder.

5. Simulated performance of the decoder

Figure 12:
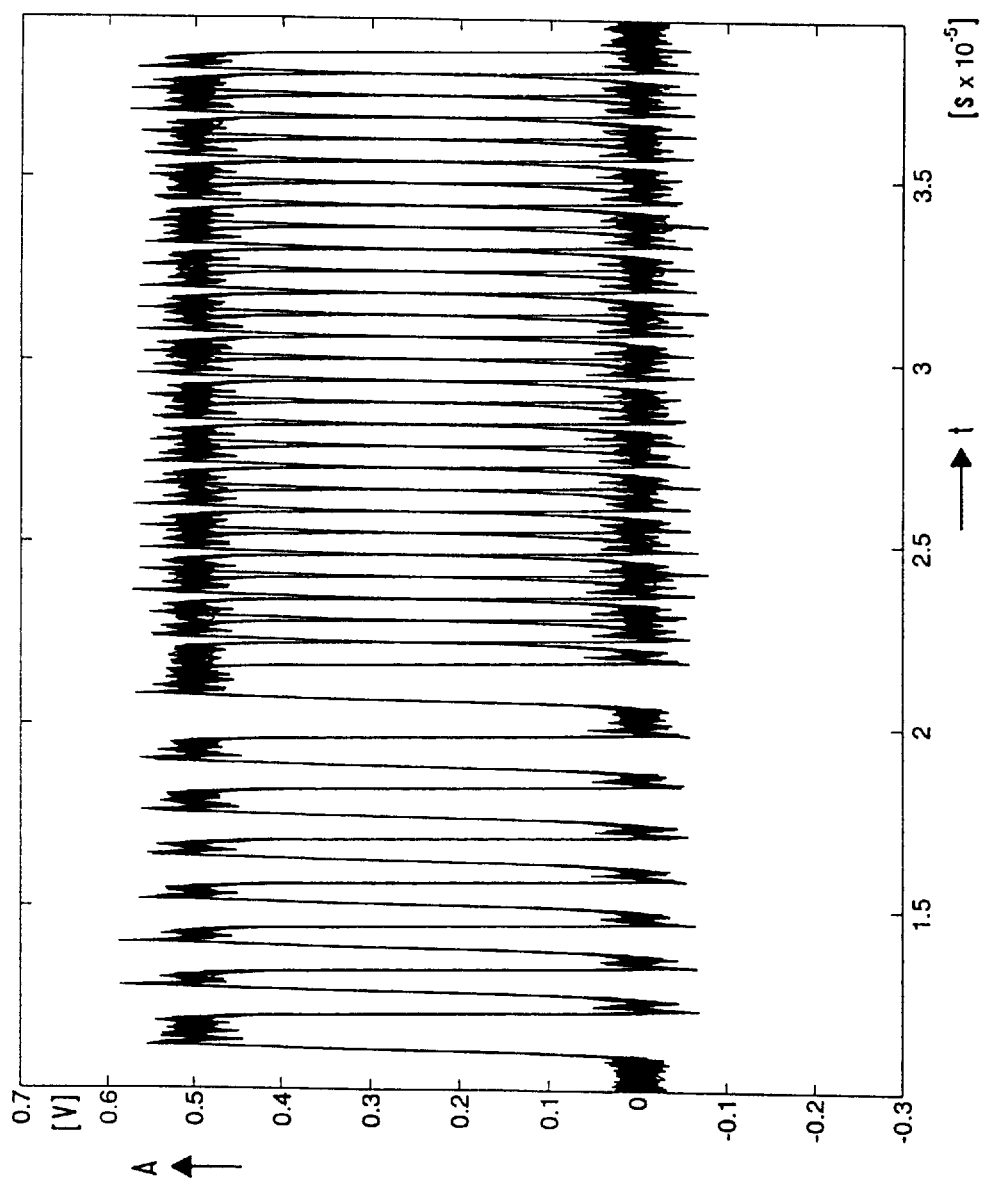
FIG. 12 shows an eye pattern of a WSS signal (coarse timing)
Figure 13:
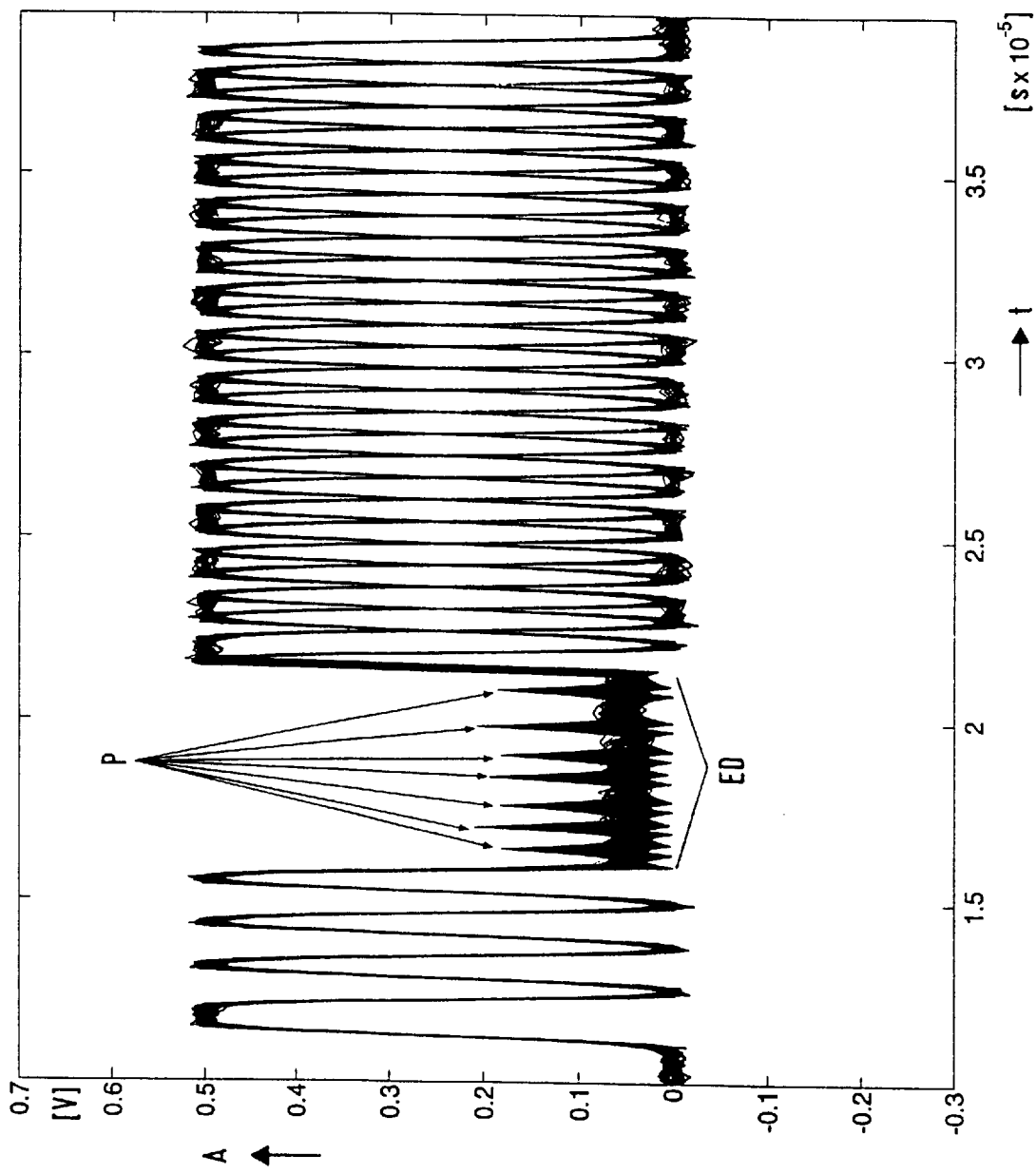
FIG. 13 shows an eye pattern of a WSS signal and disturbance estimate (coarse timing)
Figure 14:
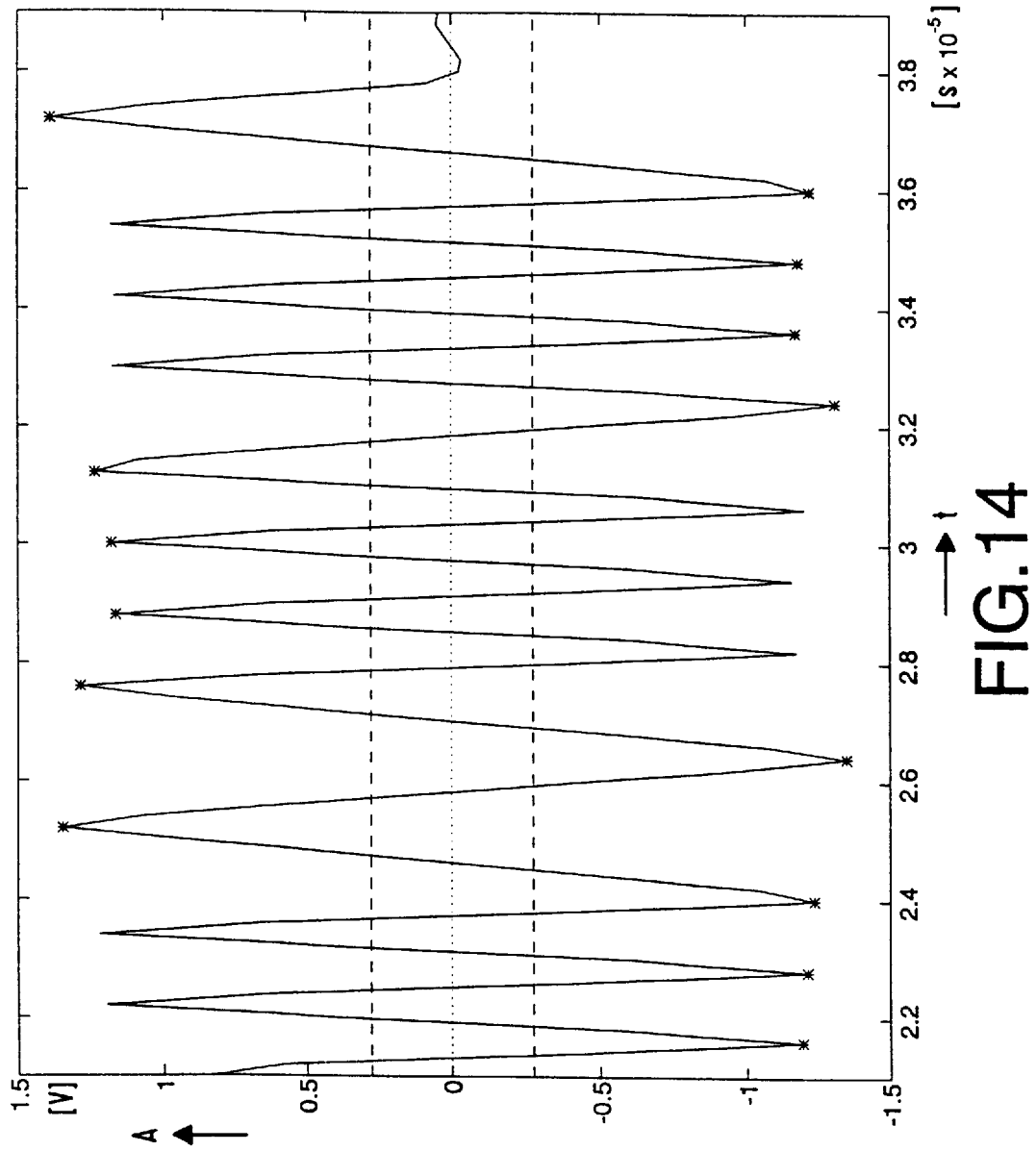
FIG. 14 shows an example of data and data reliability estimation with a threshold level.

The block schematics of FIGS. 5, 6 and 7 have been implemented in a simulation model. Some graphical results from this model are presented in FIGS. 12, 13 and 14 which show, respectively, the eye pattern of a WSS signal, the disturbance estimation, and the data and data reliability estimation process with the use of a threshold level. Note from FIG. 13 that the disturbance estimate (indicated by ED) is sensitive to the timing jitter or timing tolerance which causes ISI. The arrows P indicate the peaks due to timing jitter (or tolerance).

The performance of the new concept WSS decoder is simulated for an AWGN channel only. The performance is expressed by two probabilities:

1. The probability that line 23 WSS will be rejected: P[reject].

2. The probability of a bit error in one specific WSS bit: P[bit error].

Figure 15:
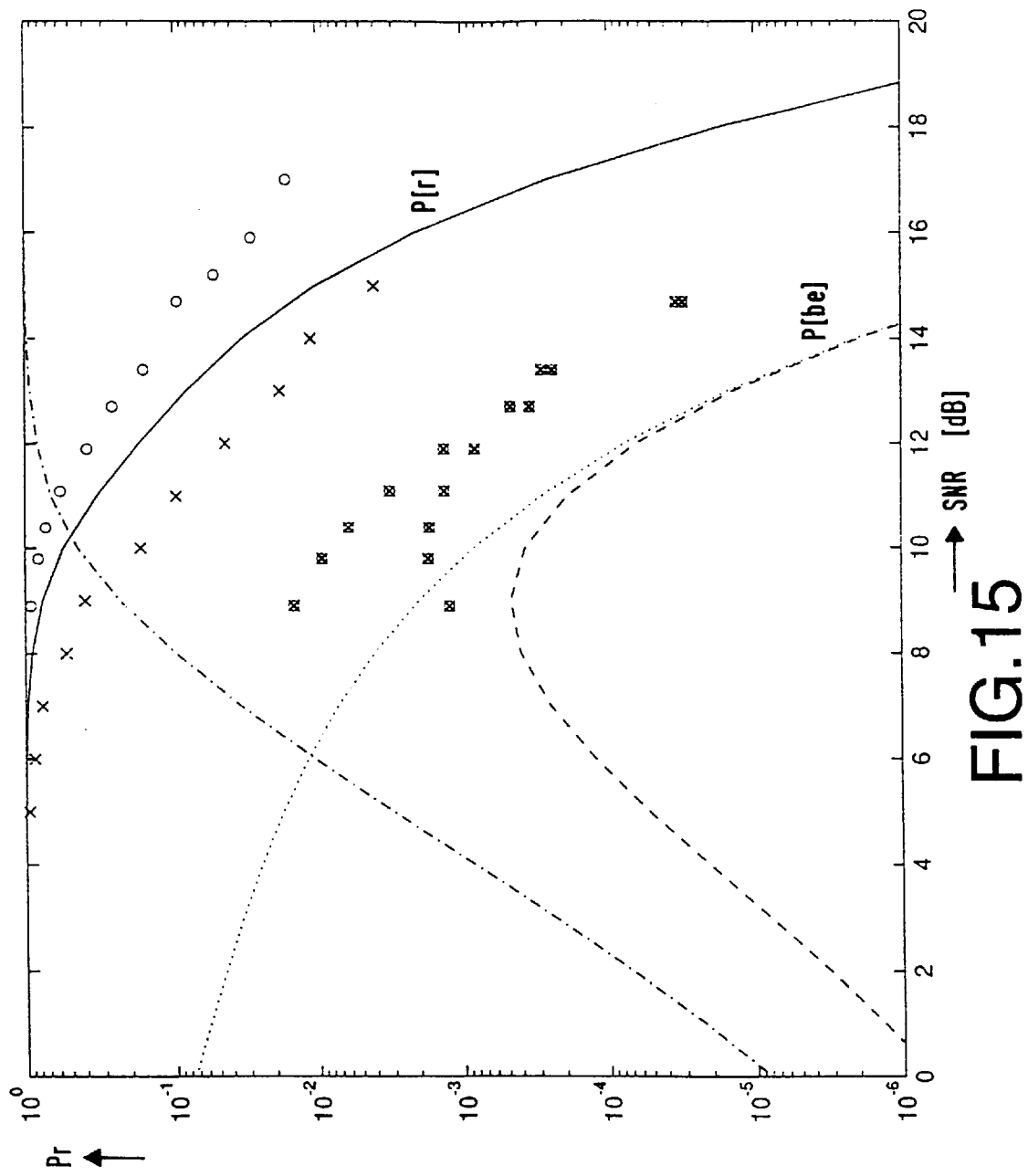
FIG. 15 shows a performance of the WSS decoder (coarse timing)

Both probabilities will be presented versus the signal-to-noise ratio (SNR). The SNR is defined in Appendix A. FIG. 15 shows the performance versus SNR (course timing estimate). The vertical axis gives the probability P, while the horizontal axis gives the picture signal-to-noise ratio SNR in dB. In the drawings, P[r] indicates P[reject], while P[be] indicates P[bit error]. In FIG. 15, the result of the simulations is shown by the "x" symbols. Due to the amount of calculational effort, P[reject] has been derived from the simulations only. A probability of P[reject]=½ is encountered at about 8 dB SNR. This figure is a practical measure of the lower limit of SNR at which the decoder still decodes the WSS information quite fast. Below this figure, the performance (and speed) of the WSS decoder will decrease very fast.

The solid, dash-dotted, dotted and dashed lines in FIG. 15 give the calculated values of P[reject], 1−P[reject], P[bit error] and P[bit error]/(1−P[reject]), respectively, which are derived from a mathematical model which will not be highlighted in this description.

The "o" and "ⓧ" symbols give the measured performance of the new concept WSS decoder of P[reject] and P[bit error] (and P[bit error]/(1−P[reject]), respectively. The difference of about 3 dB between the simulated result and the measured results in favor of the simulation results, is unfortunately due to the use of a low-pass filter with a cut-off frequency of 1 MHz, instead of an ideal filter as mentioned in section 3. However, the curves seem to have a constant difference of 3 dB versus SNR which makes it assumable that adjustment of this filter would solve the difference. This has been verified recently.

Figure 16:
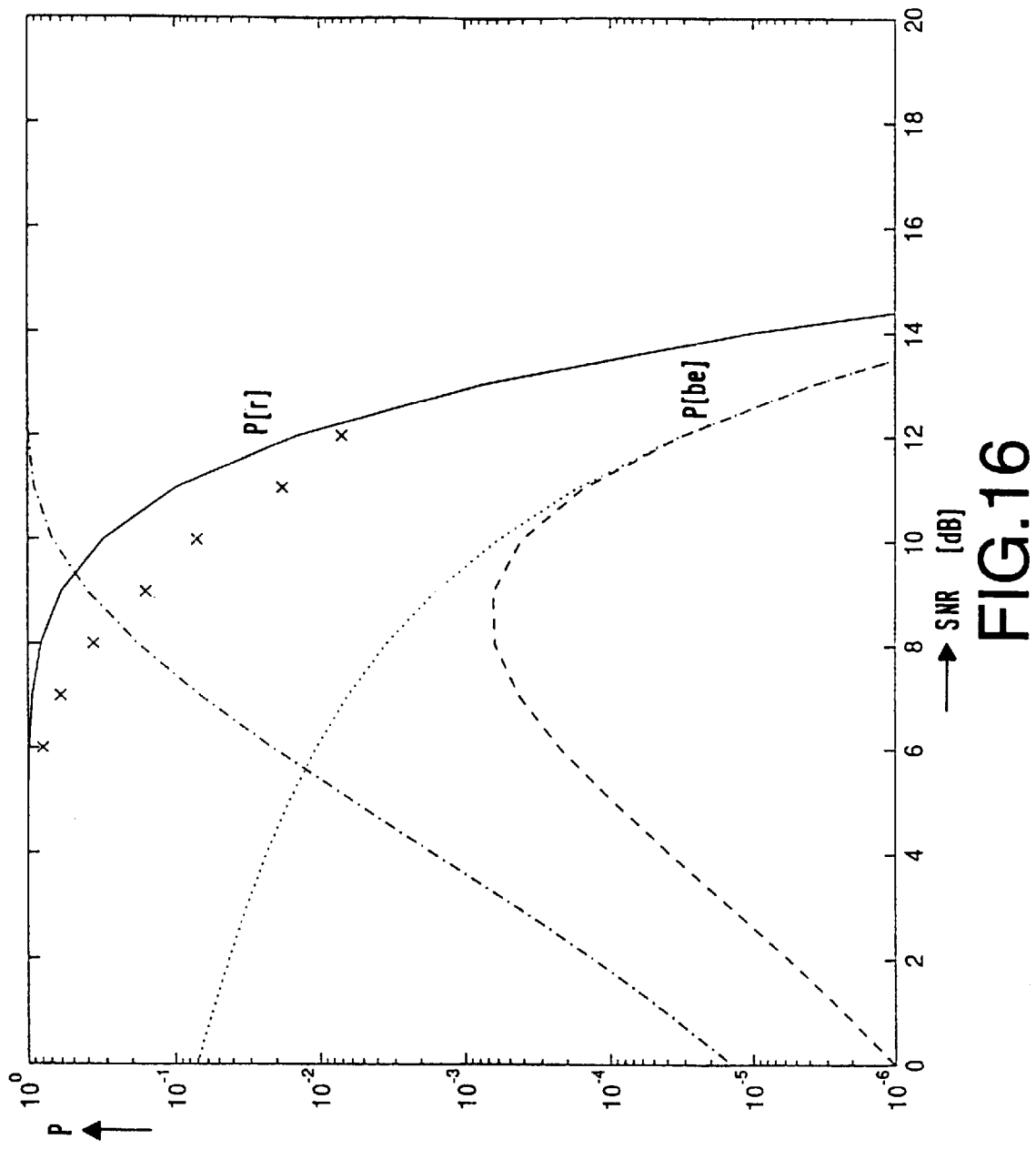
FIG. 16 shows a performance of the WSS decoder (fine timing)

In FIG. 16 the performance of a new concept WSS decoder, which uses cubic interpolation in order to improve the timing estimate (fractional timing estimate), is shown versus the SNR. The "x" symbol represents the simulation result of P[reject]. The different performance curves are from a mathematical model. If we compare the performance in case of fine timing (interpolation) versus coarse timing, we see that at P[reject]=½ there is a difference of about 0.5 dB in favor of fine timing. We can ask ourself the following question: Is a 0.5 dB improvement in performance enough basis for the cost of extra hardware?

6. Measured performance of the decoder

In the previous section, the measured performance of the new WSS decoder has already been presented with respect to noise (see FIG. 15). In this section we focus on performance results with respect to other kinds of disturbances than noise.

Here below, a summary of measurement results is given for different kind of disturbances:

Echoes.

The maximum permitted level is about −4 dB to −9 dB, which figure is highly dependent on the delay of the echo and the performance of the sync separator.

Co-channel interference (CCI).

The maximum permitted level of CCI is determined by the performance of the sync separator only.

Single carrier interference.

Single carrier interference with a frequency offset of 867 kHz with regard to vision carrier has been added to the channel. Interference with that frequency of 867 kHz is a worst case choice (see the PSD of the WSS signal in FIG. 3) In case of no WSS signal in line 23, we could not switch on the WSS decoder even at an interference level of +10 dB with regard to the vision carrier. In case of single carrier interference with the same frequency offset as above but with a WSS signal in line 23, the decoder first failed at a level of −2 dB with regard to the vision carrier.

VHS and SVHS video recorders (VCR).

The WSS decoder has been tested with several replays of VHS and SVHS recordings, which included also transmission channels, and also with replays of copies of those recordings. Multiple parameters were tuned during replay, of which the most important are sharpness control and tracking adjustment. The decoder could decode with average to high performance all replays except for some that had a non-recoverable failure in that sense that line 23 had been shifted to another line.

From the above results and experiences in the field, we know that this WSS decoder is insensitive for low (and high) frequency distortions like line tilt, satellite dispersal (25 Hz), low frequency interference, etc. The reason is that bi-phase code demodulation is applied in the decoder so that the actual data samples are freed from low-frequency components. The bi-phase code demodulator implies that no slicer circuit has to be included. This slicer has means to find a voltage level of half the data top-top amplitude in order to perform well. Such a slicer is very sensitive to low frequency distortions.

7. Conclusions

We have shown a new concept of a wide screen signalling decoder. The approach that has been used differs much from conventional decoders. The kernel of this new concept WSS decoder exists of a cross correlation technique for word sync, bi-phase code demodulation and a data and data reliability estimation technique which makes use of an RMS disturbance threshold. The combination of those three techniques in the new concept WSS decoder has shown to be very robust against all kinds of disturbances which are encountered in the television channel, including the replay of recordings of VHS and SVHS video recorders.

Appendix A: Definition of Signal-to-Noise Ratio

In relation to the composite video baseband signal (CVBS), there are several definitions of picture signal-to-noise ratio (SNR). Within the context of this disclosure, we define the picture signal-to-noise ratio as the unweighed picture signal-to-noise ratio over a vision bandwidth of 5 MHz (B,G/PAL). E.g., $$SNR = 10 \cdot \log\left(\frac{(0.7 \text{ Volt})^2}{\int_0^{B_v} N(f)df}\right) \quad (A1)$$

where 0.7 Volt is the difference in amplitude of peak white and black level in the CVBS.

Vision bandwidth $B_v$=5 MHz.

N(f) is the one sided power spectral density of the noise in the CVBS.

Figure 17:
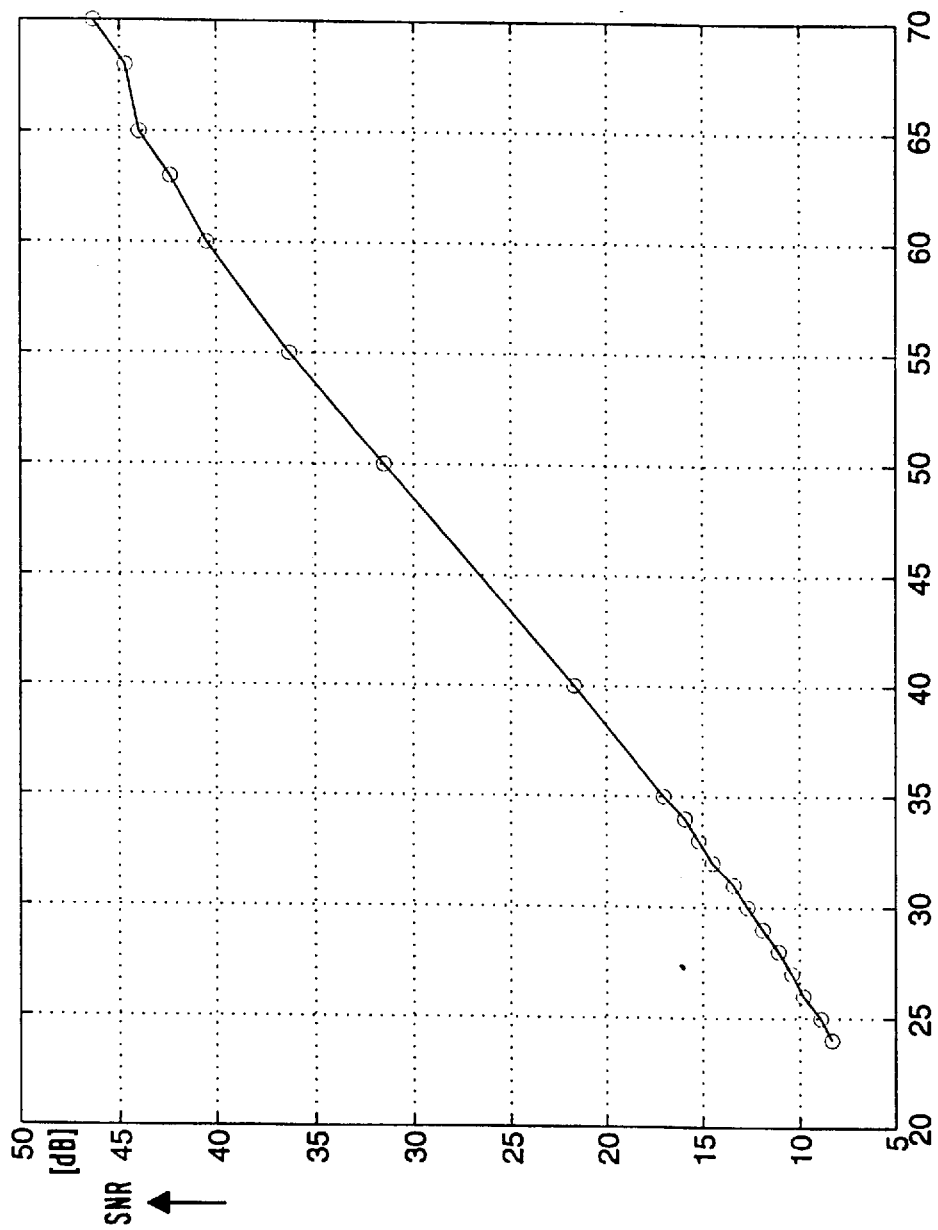
FIG. 17 shows an example of the SNR versus antenna input voltage level.

The relation between the SNR and the vision carrier-to-noise ratio (CNR) has been discussed extensively in A. P. Robinson, "The relationship between vision carrier-to-noise ratio and picture signal-to-noise ratio in a system I television receiver", Technical Report 1987/23, BBC Research Department, UK, 1987, for system I/PAL television receivers. For system B,G/PAL television receivers, this relation is somewhat different, and is given by:

$$CNR=SNR+6.8 \text{ dB} \quad (A2)$$

where the noise power spectral density is assumed to be flat in the concerning frequency band. The relation between the SNR and the antenna input voltage is dependent on the type of tuner that is used (noise figure). An example of picture SNR in dB versus antenna input voltage level in dB$\mu$V is shown in FIG. 17.

It should be noted that the above-mentioned embodiments illustrate rather than limit the invention, and that those skilled in the art will be able to design many alternative embodiments without departing from the scope of the appended claims. For example, the described method of decoding a WSS signal of a PALplus television signal can also be used to decode more reliably a VPS signal. The described method can further be used for decoding any other data signal having at least a start-code or sync word section and a data section. The invention can be implemented by means of hardware comprising several distinct elements, and by means of a suitably programmed computer. The invention is advantageously applied in a video signal receiving apparatus (e.g., a television set or a video recorder) for processing a video signal including a data signal portion, which apparatus comprises, in addition to the A/D converter 9A, the cross-correlation circuit 11A, the RMS disturbance measurement circuit 19, and the code demodulator 13A, video signal processing circuitry for processing the video signal in dependence upon the demodulated data signal to obtain a processed video signal which can be displayed on a display device (e.g., a CRT) or recorded by a recording mechanism in a video tape recorder. For example, the video signal processing circuitry may operate in dependence upon the aspect ratio bits 3210 to switch between video signal processing of a 4:3 signal and video signal processing of a 16:9 signal, with any corresponding adjustments of the deflection, such as available in current 16:9 aspect ratio receivers.

I claim:

1. A method of decoding an analog extended television signal having binary signalling information to control decoding operations, the method comprising the steps:

converting the analog extended television signal into a sequence of multi-bit samples;

processing the sequence of multi-bit samples to obtain a word sync signal indicating signalling synchronization information; and code demodulating the sequence of multi-bit samples in response to the word sync signal to obtain demodulated signalling data, wherein the processing step includes the further step:

obtaining a disturbance measurement signal from the sequence of multi-bit samples, and wherein said step of code demodulating the sequence of multi-bit samples is in dependence upon the disturbance measurement signal.

2. A method as claimed in claim 1, wherein the code demodulating step includes the further step:

obtaining a signalling information presence signal from the sequence of multi-bit samples.

3. A method as claimed in claim 1, wherein the processing step includes a multi-bit cross-correlation of the sequence of multi-bit samples to obtain the word sync signal.

4. A method as claimed in claim 1, wherein said code demodulating step comprises the further steps:

estimating signalling information data from the demodulated signalling data; and estimating a signalling information reliability from the demodulated signalling data in dependence upon the disturbance measurement signal.

5. A method as claimed in claim 4, wherein said code demodulating step comprises the further step:

detecting the occurrence of FM-clicks or spike noise in said sequence of multi-bit samples to obtain detection signals, and wherein said signalling information reliability is obtained in dependence upon said detection signals.

6. A method as claimed in claim 1, wherein the disturbance measurement signal is obtained by the steps:

determining predetermined parameters in response to a received extended start-code portion of said signalling information;

determining a replica of said extended start-code portion of said signalling information in dependence upon said predetermined parameters;

subtracting said replica from said received extended start-code portion of said signalling information to obtain a disturbance estimate; and processing said disturbance estimate to obtain said disturbance measurement signal.

7. A method as claimed in claim 6, wherein only a DC-free part of said extended start-code portion is used in obtaining said disturbance measurement signal.

8. A device for decoding an analog extended television signal having binary signalling information to control decoding operations, the apparatus comprising:

means for converting the analog extended television signal into a sequence of multi-bit samples;

means for processing the sequence of multi-bit samples to obtain a word sync signal indicating signalling synchronization information;

means for obtaining a disturbance measurement signal from the sequence of multi-bit samples; and means for code demodulating the sequence of multi-bit samples in response to the word sync signal and in dependence upon the disturbance measurement signal to obtain demodulated signalling data.

9. A method of decoding binary signalling information contained in an analog television signal to control recording or other processing operations, the method comprising the steps:

converting the analog television signal into a sequence of multi-bit samples;

processing the sequence of multi-bit samples to obtain a word sync signal indicating signalling synchronization information; and code demodulating the sequence of multi-bit samples in response to the word sync signal to obtain demodulated signalling data, wherein the processing step includes the further step:

obtaining a disturbance measurement signal from the sequence of multi-bit samples, and wherein the step of code demodulating the sequence of multi-bit samples is in dependence upon the disturbance measurement signal.

10. A method of decoding a binary data signal having at least a start-code or sync word section and a data section, the method comprising the steps:

converting the binary data signal into a sequence of multi-bit samples having at least a start-code or sync word section and a data section;

processing the sequence of multi-bit samples to obtain a word sync signal indicating synchronization information;

obtaining a disturbance measurement signal from at least the start-code or sync word section of the sequence of multi-bit samples; and code demodulating the data section of the sequence of multi-bit samples in response to the word sync signal in dependence upon the disturbance measurement signal to obtain a demodulated data signal.

11. A video signal receiving apparatus for processing an analog video signal including a binary data signal portion having at least a start-code or sync word section and a data section, the apparatus comprising:

means for converting the binary data signal into a sequence of multi-bit samples having at least a start-code or sync word section and a data section;

means for processing the sequence of multi-bit samples to obtain a word sync signal indicating synchronization information;

means for obtaining a disturbance measurement signal from at least the start-code or sync word section of the sequence of multi-bit samples;

means for code demodulating the data section of the sequence of multi-bit samples in response to the word sync signal in dependence upon the disturbance measurement signal to obtain a demodulated data signal;

means for processing the analog video signal in dependence upon the demodulated data signal to obtain a processed video signal; and means for displaying or recording the processed video signal.

* * * * *